United States Patent Office 3,004,944
Patented Oct. 17, 1961

3,004,944
PROCESS OF MASTICATING RUBBER
AND PRODUCT THEREOF
Theo Kempermann, Koln-Lindenthal, Friedrich Lober, Leverkusen-Bayerwerk, and Helmut Klappert, Koln-Stammheim, Germany, assignors to Farbenfabriken Bayer Aktiengesellschaft, Leverkusen, Germany, a corporation of Germany
No Drawing. Filed Aug. 8, 1958, Ser. No. 753,884
Claims priority, application Germany Aug. 13, 1957
17 Claims. (Cl. 260—30.2)

This invention relates to novel masticating agents for natural and synthetic rubber.

The natural rubber supplied by the plantations is generally too hard and elastic for it to be mixed directly with fillers, sulfur, accelerators and other rubber auxiliary products and then further processed to form the required rubber articles. The same conditions apply as regards standardised synthetic rubber types, for example copolymers of butadiene and styrene, butadiene and acrylonitrile and other rubber-like copolymers. It is consequently necessary to masticate it prior to the mixing process, i.e. to make it plastic. The mastication can be carried out purely mechanically without the addition of chemical auxiliaries by working on the roller or in a kneading machine. This process, which must be carried out at a low temperature, generally takes a relatively long time, however. For better exploitation of the existing processing capacities in the plant, and for saving energy, masticating agents are generally added and the mastication takes place at higher temperatures. In this way, a very rapid and uniform breakdown of the rubber is obtained.

Examples of conventional masticating agents are thiophenols which can be differently substituted in the aryl radical, and also their disulfides and zinc salts. Nitroso compounds and hydrazine derivatives have also been used as plasticizers. It is known that these compounds are very effective even in small proportions, but that on the other hand it is necessary for the concentrations of plasticizers not to fall below a certain minimum. For example, the limit of efficacy for zinc pentachlorothiophenol in the conventional mastication of natural rubber at 130° is in the range from 0.1 to 0.15%, calculated on the rubber. Below this concentration, the mastication proceeds so slowly that the procedure becomes uneconomic.

It has now been found that metal-containing compounds which have a 16-member macrocyclic ring system in which eight carbon atoms and eight nitrogen atoms are arranged alternately and in which each second nitrogen atom forms with the two adjacent carbon atoms a heterocyclic ring by way of two additional carbon or heterocyclic atoms, which if desired are substituted, whereby at least one of said heterocyclic rings contains besides the above-mentioned nitrogen atom at least one further hetero atom, are likewise suitable as masticating agents for natural or synthetic rubber.

Generally speaking, it is desirable for the masticating agents used in accordance with the invention to be employed in proportions of 0.00001 to 0.1%, preferably 0.0001 to 0.01% by weight, calculated on the rubber, for mastication purposes, and for the operation to be carried out at temperatures between 60 and 200° C.

The following formulae indicate examples of the macrocyclic compounds used in accordance with the invention, in which formula Me represents a metal atom which is at least divalent and each R represents in accordance with the above definition of the compounds of the invention an organic radical, such as for example an alkyl, such as methyl, ethyl or propyl, aryl or cycloalkyl radical, pairs of which can form unsubstituted or substituted, e.g. by halogen, alkyl, alkoxy or nitro groups, carbocyclic or heterocyclic rings, whereby said heterocyclic rings can contain for example nitrogen or sulfur:

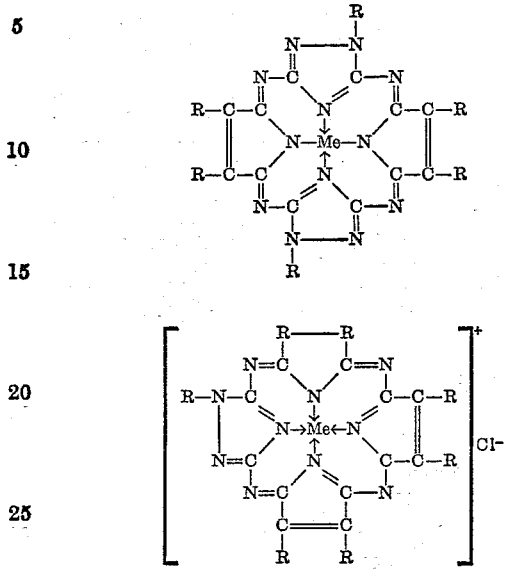

Examples of these compounds are the tetraazaporphins. The compounds always contain metals, such as iron, cobalt, nickel, chromium, manganese, zinc, aluminum, vanadium or magnesium, for example, which are combined in complex form. Effective metal complexes of the said type are for example obtained from unsubstituted or substituted amino pyrrolenines, such as for example amino-imino-isoindolenines or from maleic acid or maleic acid derivatives, with guanazole (3,5-diamino-triazole-(1,2,4)) or substituted guanazoles and metal salts.

The masticating agents are used in the conventional manner, e.g. by adding these compounds to the natural or synthetic rubber to be masticated on a roller or a kneader and masticating this mixture at elevated temperature. It is, however, advantageous to employ them in admixture with inert fillers, since they can otherwise be only unsatisfactorily and incompletely dispersed in the rubber, on account of the very low proportion used. It is generally advisable to select a ratio of 1:50 to 1:500 between the weights of masticating agent and filler.

Suitable fillers are e.g. kaolin, bleaching earth, siliceous chalk, highly dispersed silica and silicates, such as usually employed in the processing of rubber.

The compounds employed in accordance with the invention develop their effect independently of other additives. It is consequently possible to effect mastication without the addition of any other known masticating agent. If it is desired, there can be used mixtures of masticating agents also with other known masticating agents such as for example pentachlorothiophenol or its zinc salt and the compounds hereinbefore described, possibly with the further addition of inert fillers. If it is desired, e.g. to keep the concentration of the metal-containing macrocyclic compounds as small as possible then there can be added for example a suitable masticating agent of the thiophenol type, for example zinc pentachlorothiophenol or pentachlorothiophenol. This mixture gives the same efficacy as with a higher concentration of the metal complex alone. The proportion of conventional masticating agents then necessary is substantially smaller than when the metal complex is not present.

The ageing properties of vulcanizates of rubber which has been masticated with the previously described complex compounds, possibly in combination with known masticating agents are excellent and do not differ in any way from those of vulcanizates which have been produced from a rubber which has been masticated exclusively with known chemical masticating agents. The metal combined in complex form in the complex compounds used in accordance with the invention therefore does not cause any additional breakdown in the vulcanizate under the usual ageing conditions.

The following examples shows the action of the compounds in accordance with the invention, both in cases where they are mixed only with inert fillers and also in cases where they are combined with known masticating agents. In the tables of these examples the 1. number indicates the Defo values according to DIN 53514 and the 2. number the Defo elasticity. The amounts used are percent by weight of not otherwise indicated.

Furthermore, the following tetraazaphorphins or hemiporphyrazines are designated by the letters A—D:

Compound A:

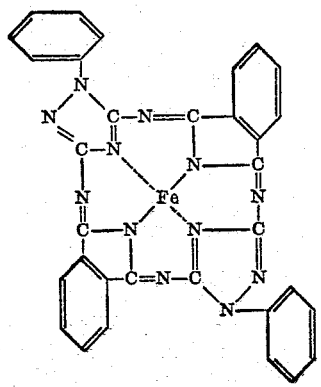

Compound B:

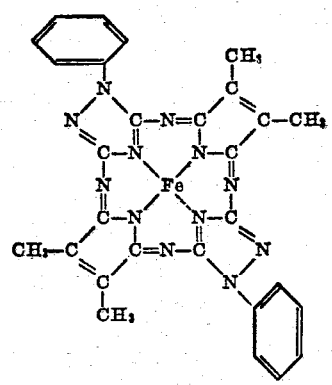

Compound C:

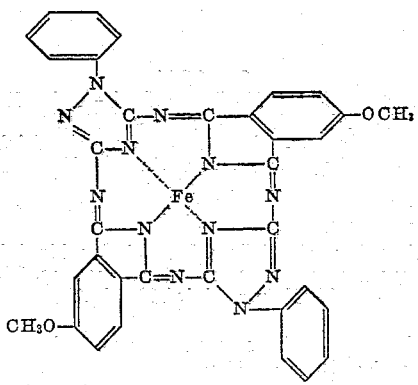

Compound D:

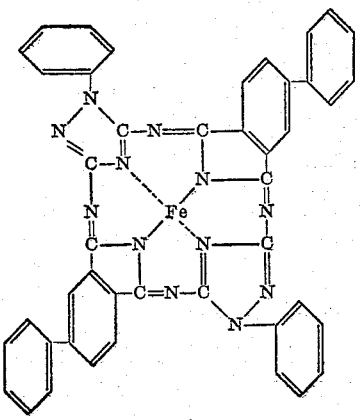

EXAMPLE 1

*Mastication of smoked sheets at 130° C. in a 2-liter kneader*

| Masticating agent | Without addition | Zinc pentachlorothiophenol (100%) | Blend—Kaolin 99.25% Compound A 0.75% | Blend—Kaolin 99.7% Compound A 0.3% | Blend—Zinc pentachlorothiophenol 33%, Kaolin 66.9%, Compound A 0.1% | Blend—Zinc pentachlorothiophenol 33%, Kaolin 67% |
|---|---|---|---|---|---|---|
| Proportion in percent (calc. on rubber) | | 0.25 | 0.25 | 0.25 | 0.25 | 0.25 |
| Defo values after— | | | | | | |
| 0 min | 2,200/32.3 | 2,200/32.3 | 2,200/32.3 | 2,200/32.3 | 2,200/32.3 | 2,200/32.3 |
| 4 min | 1,750/37.7 | 525/18.7 | 475/15.3 | 625/15.7 | 550/22.3 | 1,100/25.0 |
| 8 min | 1,400/25.7 | 250/16.0 | 230/8.7 | 290/13.0 | 325/16.7 | 800/20.7 |
| 12 min | 1,175/21.0 | 180/12.0 | 110/6.7 | 170/10.0 | 230/18.0 | 675/19.0 |
| 16 min | 950/20.3 | 130/8.3 | 50/6.7 | 110/7.3 | 170/13.0 | 600/17.3 |

EXAMPLE 2

*Mastication of smoked sheets at 130° C. in a 2-liter kneader*

| Masticating agent | Without addition | Blend—Kaolin 99.7%, Compound B 0.3% |
|---|---|---|
| Proportion in percent (calc. on rubber) | | 0.25 |
| Defo values after— | | |
| 0 min | 2,350/36.3 | 2,350/36.3 |
| 4 min | 1,800/30.3 | 950/25.0 |
| 8 min | 1,500/27.3 | 775/23.0 |
| 12 min | 1,300/25.0 | 650/19.3 |
| 16 min | 1,175/22.7 | 600/19.3 |

EXAMPLE 3

*Mastication of smoked sheets at 130° C. in a 2-liter kneader*

| Masticating agent | Without addition. | Blend— Kaolin 99.7%, Compound D 0.3%. | Blend— Kaolin 99.7%, Compound C 0.3%. |
|---|---|---|---|
| Proportion in percent (calc. on rubber). | | 0.25 | 0.25. |
| Defo values after— | | | |
| 0 min | 2,150/34.5 | 2,150/34.5 | 2,150/34.5. |
| 4 min | 1,750/30.7 | 650/18.3 | 850/22.0 |
| 8 min | 1,350/25.7 | 300/13.0 | 500/15.5. |
| 12 min | 1,050/22.5 | 170/9.7 | 350/15.0. |
| 16 min | 900/21.7 | 95/4.0 | 290/14.7. |

EXAMPLE 4

*Mastication of butyl rubber (1.5 mol percent isoprene) in a 2-liter kneader at 130° C. rubber temperature*

| Masticating agent | Without addition. | Zinc pentachlorothiophenol 33.0%, Kaolin 66.9%, Compound A 0.1%. | Zinc pentachlorothiophenol 100.0%. |
|---|---|---|---|
| Proportion in percent. | | 0.3 | 0.3. |
| Defo values after— | | | |
| 0 min | 1,150/22.3 | 1,150/22.3 | 1,150/22.3. |
| 4 min | 1,075/24.7 | 650/13.7 | 825/17.3. |
| 8 min | 1,125/21.3 | 400/10.7 | 575/12.0. |
| 12 min | 1,075/21.3 | 300/7.0 | 325/7.7. |
| 16 min | 1,050/20.3 | 210/4.7 | 240/5.0. |

EXAMPLE 5

*Mastication of smoked sheets at 130° C. in a 2-liter kneader*

| Masticating agent | Without addition | Blend—Kaolin 99.7%, Compound E 0.3%. |
|---|---|---|
| Proportion in percent. | | 0.25. |
| Defo values after— | | |
| 0 min | 2,350/36.3 | 2,350/36.3. |
| 4 min | 1,800/30.3 | 725/17.7. |
| 8 min | 1,500/27.3 | 350/15.3. |
| 12 min | 1,300/25.0 | 220/11.0. |
| 16 min | 1,175/22.7 | 140/6.7. |

Compound E was obtained by heating: 9 g. of 1-phenyl-3,5-diaminotriazol-1,2,4, 15 g. of 1-amino-3-iminoisoindolenine and 5 g. of iron-II-chloride in 150 ml. of glycol for 8 hours to 100–110° C. Upon diluting the mixture with methanol the reaction product is filtered off and washed with methanol and water. Yield: 14 grams.

We claim:

1. Process for the mastication of a member selected from the group consisting of natural rubber, rubbery diolefin homopolymers, and rubbery copolymers of diolefins and monoolefins which comprises masticating the same in the presence of metal-containing compounds which have a 16-membered macrocyclic ring system in which 8 carbon atoms and 8 nitrogen atoms are arranged alternatively and in which each second nitrogen atom forms a heterocyclic ring with the two adjacent carbon atoms by means of a linkage selected from one of the following groupings:

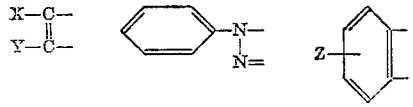

wherein X and Y represent a lower alkyl radical and Z is selected from the group consisting of hydrogen, phenyl, lower alkoxy, halogen, and alkyl radicals and wherein the grouping

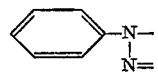

is contained at least once in the molecule.

2. Process as claimed in claim 1, wherein the compounds are used in admixture with other masticating agents.

3. Process as claimed in claim 1, wherein the following compound is used as masticating agent:

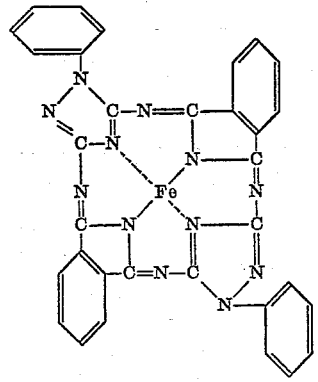

4. Process as claimed in claim 1, wherein the following compound is used as masticating agent:

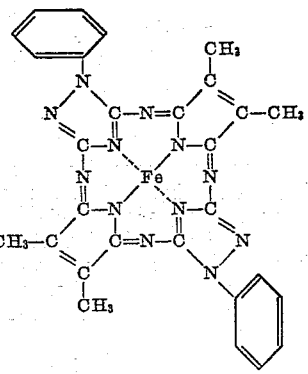

5. A masticated polymer selected from the group consisting of natural rubber, rubbery diolefin homopolymers, and rubbery copolymers of diolefins and mono-olefins, said polymer having been masticated in the presence of metal-containing compounds which have a 16-membered macrocyclic ring system in which 8 carbon atoms and 8 nitrogen atoms are arranged alternatively and in which each second nitrogen atom forms a heterocyclic ring with the two adjacent carbon atoms by means of a linkage selected from one of the following groups:

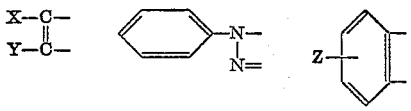

wherein X and Y represent a lower alkyl radical and Z is selected from the group consisting of hydrogen, phenyl, lower alkoxy, halogen, and alkyl radicals and wherein the grouping

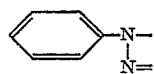

is contained at least once in the molecul.

6. Process of claim 1 wherein the polymer is natural rubber.

7. Process of claim 1 wherein the polymer is a copolymer of isobutene and isoprene.

8. Process of claim 1 wherein the masticating agent is a compound of the formula

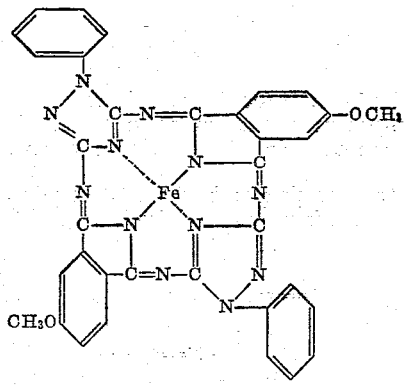

9. Process of claim 1 wherein the masticating agent is a compound of the formula

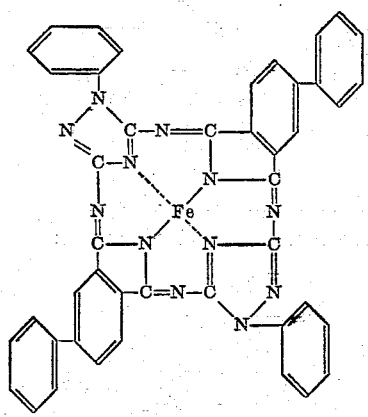

10. A process for the mastication of natural rubber which comprises masticating said natural rubber in the presence of the masticating agent of claim 3.

11. A process for the mastication of natural rubber which comprises masticating said natural rubber in the presence of the masticating agent of claim 4.

12. Process for the mastication of a member selected from the group consisting of natural rubber, rubbery diolefin homopolymers, and rubbery copolymers of diolefins and monoolefins which comprises masticating the same in the presence of metal-containing compounds which have a 16-membered macrocyclic ring system in which 8 carbon atoms and 8 nitrogen atoms are arranged alternatively and in which each second nitrogen atom forms a heterocyclic ring with the two adjacent carbon atoms by means of a linkage selected from one of the following groupings:

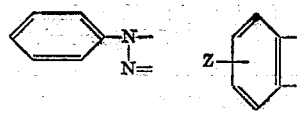

wherein X and Y represent a lower alkyl radical and Z is selected from the group consisting of hydrogen, phenyl, lower alkoxy, halogen, and alkyl radicals and wherein the grouping

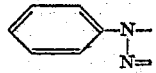

is contained at least once in the molecule.

13. Process of claim 12 wherein the rubber being masticated is natural rubber.

14. Process of claim 12 wherein the rubber is a copolymer of isobutene and isoprene.

15. Process for the mastication of a member selected from the group consisting of natural rubber, rubbery diolefin homopolymers, and rubbery copolymers of diolefins and monoolefins which comprises masticating the same in the presence of metal-containing compounds which have a 16-membered macrocyclic ring system in which 8 carbon atoms and 8 nitrogen atoms are arranged alternatively and in which each second nitrogen atom forms a heterocyclic ring with the two adjacent carbon atoms by means of a linkage selected from one of the following groupings:

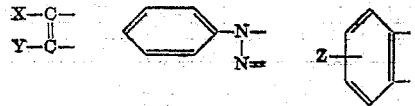

wherein X and Y represent a lower alkyl radical and Z is selected from the group consisting of hydrogen, phenyl, lower alkoxy, halogen, and alkyl radicals and wherein the grouping

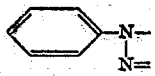

is contained at least once in the molecule.

16. Process of claim 15 wherein the rubber being masticated is natural rubber.

17. Process of claim 15 wherein the rubber is a copolymer of isobutene and isoprene.

References Cited in the file of this patent

UNITED STATES PATENTS 2,860,116    Pikl _____ Nov. 11, 1958